United States Patent [19]
Donner

[11] Patent Number: 5,999,907
[45] Date of Patent: Dec. 7, 1999

[54] INTELLECTUAL PROPERTY AUDIT SYSTEM

[76] Inventor: Irah H. Donner, 631 Sonata Way, Silver Spring, Md. 20901

[21] Appl. No.: 08/161,816

[22] Filed: Dec. 6, 1993

[51] Int. Cl.6 .................................................. G06F 153/00
[52] U.S. Cl. .................................................................. 705/1
[58] Field of Search .................................. 364/401, 406, 364/408, 710; 705/1, 10, 22, 24

[56] References Cited

U.S. PATENT DOCUMENTS

| | | | |
|---|---|---|---|
| 4,334,270 | 6/1982 | Towers | 364/408 |
| 5,220,500 | 6/1993 | Baird et al. | 364/408 |

OTHER PUBLICATIONS

Encyclopedia of Computer Science, Ralston et al., 1993, Van Nostrand Reinhold, New York, pp. 904–907.
Business Week, Aug. 9, 1993, pp. 57–62, "The Global Patent Race Picks Up Speed".

Primary Examiner—Frantzy Poinvil
Attorney, Agent, or Firm—Pepper Hamilton LLP

[57] ABSTRACT

An intellectual property computer-implemented audit system for valuing an intellectual property portfolio includes a first database storing first information relating to the intellectual property portfolio and a database access and collection device connected to the first database and accessing the first database and retrieving the first information. In addition, the intellectual property audit system also includes a second database storing empirical data relating to known intellectual property portfolios, and a comparison device connected to the database access and collection device and to the second database, the comparison device receiving the first information from the database access and collection device and comparing the first information to the empirical data retrieved from the second database producing an intellectual property worth indicator indicating the worth of the intellectual property portfolio.

22 Claims, 2 Drawing Sheets

INTELLECTUAL PROPERTY AUDIT SYSTEM

BACKGROUND OF THE INVENTION

1. Field of the Invention

The present invention generally relates to the field of intellectual property audit systems, and more particularly, to the field of intellectual property systems which collects pertinent data regarding an intellectual property portfolio and analyzes the collected data against empirical data to provide a qualitative and/or quantitative analysis of the intellectual property portfolio.

2. Description of the Related Art

In general, purchasers of assets which are intellectual property intensive typically purchase these assets based upon some estimated value which, of course, begins with an offer for sale. When a creditor is considering advancing funds based upon the value of fixed assets, such as equipment, an appraisal is performed and a liquidation value is determined. Then a liquidity adjustment is considered and a liquidation value is concluded. The same valuation approaches can be employed to determine the liquidation value of intellectual property. It is known to value intellectual property assets with respect to various accounting procedures which conform to Generally Accepted Accounting Procedures (GAAP). There are typically three such procedures: cost, market and income approaches.

The cost approach gives consideration to the cost to reproduce or replace the subject intellectual property. For example, for patent intellectual property, this approach would consider the cost associated with research, engineering, design and testing activities. In trademark cases the advertising expenses that would be needed to create a trademark of similar prominence would be considered.

From this amount an allowance is deducted to reflect all forms of depreciation or obsolescence present, whether it arises from physical, functional or economic causes. Physical deterioration (depreciation) is the loss in value resulting from wear and tear from operations and exposure to the elements. Functional obsolescence is the loss in value within the property as a result of such things as changes in design, materials, or processes, overcapacity, inadequacy, excess construction, lack of utility, and excess operating cost. Economic obsolescence is the loss in value that results from influences external to the property such as the general state of economy, the effect of governmental regulations, and the like. A summary of the cost approach is presented below.

Replacement cost
Less: Physical Depreciation
Less: Functional Obsolescence
Less: Economic Obsolescence
Equals: Fair Market Value Physical and functional obsolescence is not usually an important factor when valuing intellectual property but care is needed to consider the economic obsolescence that can be introduced by outside forces.

Unfortunately the cost to develop intellectual property rarely bears any relationship to the economic earning power of the property or the value-of the property.

The market approach gives consideration to prices paid for similar property in arm's length transactions. Adjustments can be made, if necessary, to the indicated market prices to reflect the condition and utility of the property being appraised relative to the market comparative. This approach is applicable where there is an active market with a sufficient quantity of reliable and verifiable data. Usually, similar property that exchanged between independent parties for which price data is disclosed is impossible to find for intellectual properties. The activities of the Resolution Trust Corporation are however beginning to provide some of the previously missing data. At present, the market approach is difficult to implement for intellectual property.

The income approach, by default, is still the most preferred method. It considers the present value of the prospective economic benefits of owing the appraised property. This involves a capitalization of the forecasted income stream with consideration given to the duration of the income and the risks related to its achievement.

Care must be employed to assure that economic benefits derived from the intellectual property are isolated from the contribution to earnings derived from the complementary assets of the business. When properly done, the income approach can provide an accurate indication of the fair market value of intellectual property. Once the fair market value of the intellectual property portfolio has been determined, then as indicated above, the fair market value is adjusted according to conventional methods which consider effects such as amount of time required to dispose of the portfolio, market evidence of similar intellectual property portfolios sold in liquidation and cost to liquidate the property.

These accepted accounting methods rely or function on the availability of sufficient data relating to the intellectual property portfolio itself. Thus, in this situation, the seller of the intellectual property portfolio typically has used and marketed the intellectual property over a sufficiently long time period that suitable data has been collected to formulate a price based upon one of the above accounting valuation techniques. However, these accounting techniques typically do not provide reliable and/or dependable valuation results when the seller of the intellectual property portfolio has not collected data or has not used or marketed the portfolio long enough to obtain such data.

In addition, for typical purchases of intellectual property assets, there is typically unavailable an independent indicator of the worth of the intellectual property to be sold. The independent indicator which is lacking may be either a qualitative or quantitative indicator of the worth of the intellectual property portfolio.

Accordingly, it is desirable to provide an independent analysis of an intellectual property portfolio including an independent qualitative or quantitative worth indicator of the intellectual property portfolio to be acquired.

In addition, it is also desirable to provide an intellectual property audit system that does not depend on the owner of the portfolio having previously used and marketed the portfolio.

It is further desirable to provide an intellectual property audit system which can be used to determine the qualitative and/or quantitative value of the intellectual property portfolio in an efficient and relatively rapid manner.

It is also desirable to provide the qualitative and/or quantitative value by analyzing the intellectual property itself in a mechanized manner as well as considering external factors relating to, for example, characteristics of the purchasing and selling entities.

Finally, it is also desirable that the intellectual property audit system be provided with the ability to output requests for manual assistance to correct, for example, erroneously entered data or incomplete or insufficient data causing the intellectual property audit system to be unable to completely analyze the input data for determining of an intellectual property portfolio value. Accordingly, the audit system permits a user to manually correct or complete data to permit the audit system to determine a qualitative and/or quantitative intellectual property portfolio value.

SUMMARY OF THE INVENTION

It is, therefore, an object of the present invention to provide an independent analysis of an intellectual property portfolio including an independent qualitative or quantitative worth indicator of the intellectual property portfolio to be acquired.

It is also an object of the present invention to provide an intellectual property audit system that does not depend on the owner of the portfolio having previously used and marketed the portfolio.

It is also an object of the present invention to provide an intellectual property audit system which can be used to determine the qualitative and/or quantitative value of the intellectual property portfolio in an efficient and relatively rapid manner.

It is another object of the present invention to provide the qualitative and/or quantitative value by analyzing the intellectual property itself in a mechanized manner as well as considering external factors relating to, for example, characteristics of the purchasing and selling entities.

Further, it is an object of the present invention that the intellectual property audit system be provided with the ability to output requests for manual assistance to correct, for example, erroneously entered data or incomplete or insufficient data causing the intellectual property audit system to be unable to completely analyze the input data for determining of an intellectual property portfolio value. Accordingly, the audit system permits a user to manually correct or complete data to permit the audit system to determine a qualitative and/or quantitative intellectual property portfolio value.

To achieve these and other objects, the present invention provides an intellectual property computer-implemented audit system for valuing an intellectual property portfolio. The intellectual property audit system includes a first database storing first information relating to the intellectual property portfolio and a database access and collection device connected to the first database and accessing the first database and retrieving the first information. In addition, the intellectual property audit system also includes a second database storing empirical data relating to known intellectual property portfolios, and a comparison device connected to the database access and collection device and to the second database, the comparison device receiving the first information from the database access and collection device and comparing the first information to the empirical data retrieved from the second database producing an intellectual property worth indicator indicating the worth of the intellectual property portfolio.

These together with other objects and advantages which will be subsequently apparent, reside in the details of construction and operation as more fully hereinafter described and claimed, with reference being had to the accompanying drawings forming a part hereof, wherein like numerals refer to like elements throughout.

DESCRIPTION OF THE PREFERRED EMBODIMENT

The intellectual property audit system according to the present invention may be used as an integrity check for acquisitions having assets involving a substantial intellectual property portfolio. The system could be used to compare the intellectual property portfolio to be acquired with other intellectual property portfolios having known market values to obtain an indicator of the intellectual property portfolio's worth. Depending on the quality of empirical data, the intellectual property audit system of the present invention could provide a qualitative and/or quantitative analysis of an intellectual property portfolio which is to be acquired.

Figure 2:
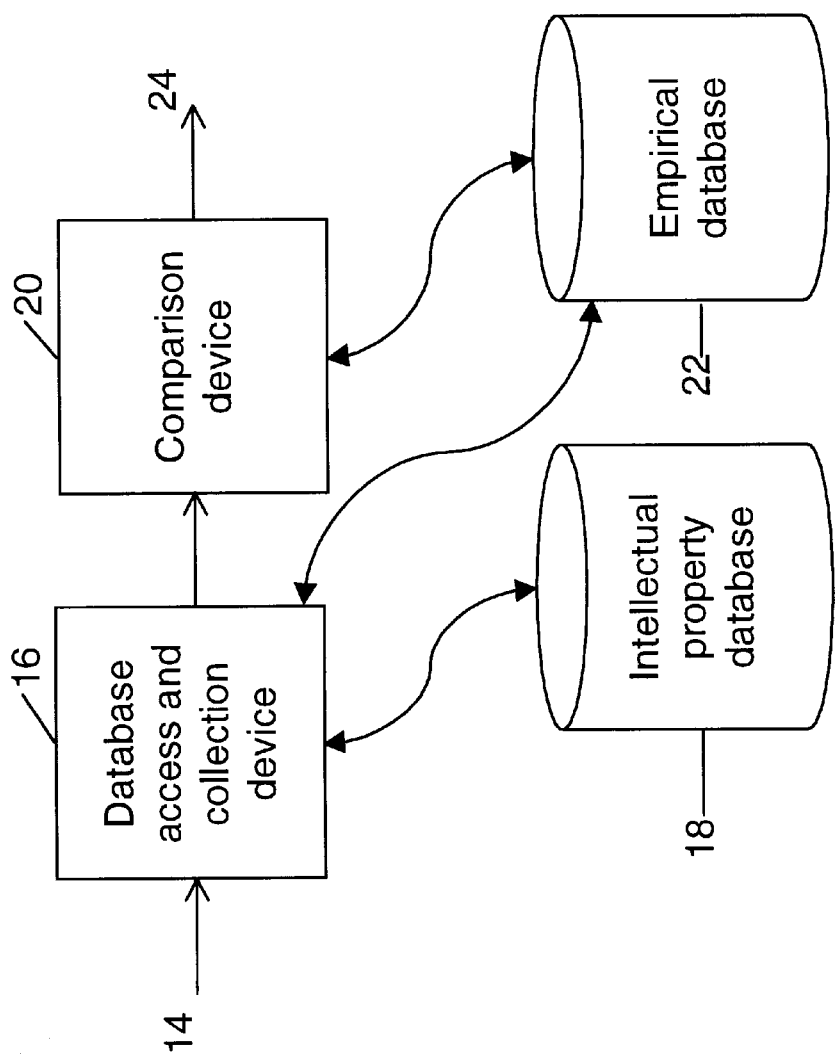
FIG. 2 is a conceptual diagram of the intellectual property audit system of the present invention.

FIG. 2 is a conceptual diagram of the intellectual property audit system of the present invention. The intellectual property audit system would operate in general terms as follows. In FIG. 2, the user of the audit system would input the appropriate data to an input device 14. In the most basic form, the input data might simply be a list of patent numbers for an intellectual property portfolio comprising only patents.

Next, the data would be transmitted to a database access device 16 which would collect various data from different on-line intellectual property databases 18. The collected data represents different intellectual property worth indicators. Each worth indicator would then be assigned a value which would be approximated using previously collected indicator values which are based on intellectual property portfolios which have known worth or dollar values by consulting empirical database 22. For example, the audit system could access a full text patent database such as DIALOG to analyze the listed patents. Specifically, the system could determine how many claims, dependent and independent, are in each patent. A high value would be assigned to this indicator is there are many claims, indicating that the drafter or owner of the patent considered the patent of significant importance. Additionally, the number of references cited or number of classes searched could also be gathered and a high value assigned to the indicator when the patent lists many classes or many cited references. The rationale for the high value would be that there is reason to believe that the examiner performed a detailed examination leaving the issued patent strong. Further, each patent could also be searched to determine how often the patent itself has been cited as a reference on other patents. Higher values would be assigned to a patent cited more often than not, indicating that the patent was perhaps a breakthrough in a particular field.

Similar information could also be collected for trademarks which are included in the intellectual property portfolio from such databases as DIALOG's FEDERAL TRADEMARK SCAN and STATE TRADEMARK SCAN which inventory federal and state trademarks, respectively. Based upon these databases, a user might, for example, determine whether a trademark includes disclaimers to certain words in the trademark and/or how many classes the trademark has been issued for or covers. In addition, ORBIT's LEGAL STATUS database includes recent information affecting the trademark, and LEXIS' NEXIS database could be used to determine any recent information relating to the trademark which has been published in trade magazines or newspapers.

Finally, intellectual property which also includes copyrighted work could also be considered in a similar manner. For example, computer software related intellectual property might include both patents on the computer system as well as copyrights on the software itself.

Once all the worth indicators have been determined, they are transmitted to an indicator comparing device 20 which would compare the collection of worth indicators to known collections of worth indicators from known intellectual property portfolios stored in empirical database 22. Known distribution or estimation techniques could be used to determine which known intellectual property portfolio the intellectual property portfolio which is to be acquired matches the closest. Finally, the system would output the known portfolio worth value 24 for which the portfolio to be acquired matches the most, signifying a rough approximation of the worth of the portfolio to be acquired. A detailed description of the intellectual property audit system according to the present invention follows.

Figure 1:
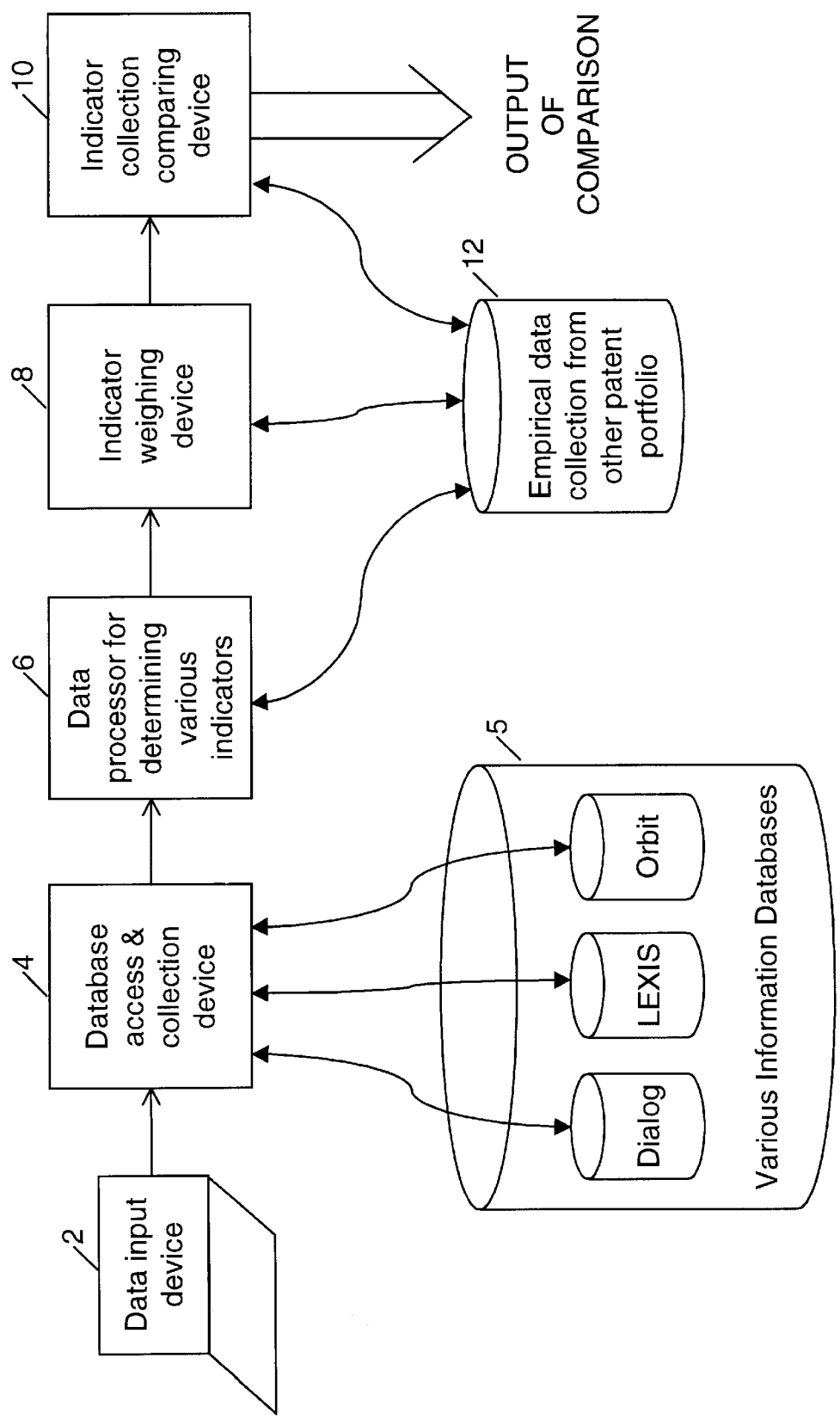
FIG. 1 is a detailed block diagram of the structure of the intellectual property audit system of the present invention.

FIG. 1 represents a block diagram representation of the proposed intellectual property audit system. In FIG. 1, data input device 2 is used to input the necessary data representing the intellectual property portfolio to be acquired. This data may be, for example, simply the list of patent numbers in the portfolio, or the data might include additional information relating to the specific intellectual property portfolio or the selling/acquiring entities which might not be readily retrievable from current databases. For example, the additional information might include financial information regarding the selling/acquiring entities or recent performance in the stock market. Data input device 2 is a standard input device and may include, for example, the data entry system in U.S. Pat. No. 4,012,720 or the data entry interface assembly in U.S. Pat. No. 4,638,422, incorporated herein by reference. In any event, the data is entered and then transmitted to database access and collection device 4.

Database access and collection device 4 filters the received data to determine which aspects of the received data are to be further analyzed by retrieving information regarding the data from various on-line databases. For example, database access and collection device 4 would determine that the received patent numbers should be used to analyze the patents while the received financial data might not be further analyzed and simply transmitted to data processor 6 for later evaluation.

With respect to the data which is to be analyzed, database access and collection device 4 will access the various databases having information concerning the data to be analyzed and collect the necessary information regarding the data. For example, with respect to the patent number information, database access and collection device 4 would access the ORBIT database to determine if the patent is currently involved in a pending litigation using such databases as the LITALERT Database, or whether the patent is under reexam or reissue using such ORBIT databases as LEGAL STATUS or PATENT STATUS. Database access and collection device 4 could also access the LEXIS/NEXIS database to determine whether any newspapers have published any current information regarding the patents as well as determining whether the patent has been involved in previous lawsuits by accessing the legal reporter files.

Finally, database access and collection device 4 can also access a full-text patent database such as DIALOG to either collect the necessary information directly from DIALOG or to obtain the patents themselves. The types of patent information which would provide important information could be of two forms. The first type of information would-be patent information derived directly from the patents. Such information would include number of claims, the length of the independent claims, number of references cited, number of classes searched, whether the patent is a reissue or reexam, number of years until patent expires or in which group the patent was examined. In addition, the indicators may include whether the inventor(s) is a U.S. or foreign citizen, or whether the current owner is U.S. or foreign based. Further, information regarding U.S. or foreign priority, and whether the cited references have publication dates near the priority dates could also be considered.

The second type of information would not be derived from the patent itself, but would be information derived from other patents. For example, this information might be how often the patent being acquired has been cited as a reference for other patents.

Similar information could also be collected for trademarks which are included in the intellectual property portfolio from such databases as DIALOG's FEDERAL TRADEMARK SCAN and STATE TRADEMARK SCAN which inventory federal and state trademarks, respectively. Based upon these databases, a user might, for example, determine whether a trademark includes disclaimers to certain words in the trademark and/or how many classes the trademark has been issued for or covers. In addition, ORBIT's LEGAL STATUS database includes recent information affecting the trademark, and LEXIS' NEXIS database could be used to determine any recent information relating to the trademark which has been published in trade magazines or newspapers.

Finally, intellectual property which also includes copyrighted work could also be considered in a similar manner. For example, computer software related intellectual property might include both patents on the computer system as well as copyrights on the software itself.

Database access and collection device 4 may be any standard device which may interface with the various other databases using, for example, software which is able to mimic or compatible with the software systems of the various databases. Accordingly, database access and collection device 4 may include, for example, the data collection system in U.S. Pat. No. 3,810,101 or the information retrieval system in U.S. Pat. No. 4,064,490, incorporated herein by reference. Additionally, database access and collection device 4 may also include, for example, the machine translation system in U.S. Pat. No. 4,814,988 or the computer method for automatic extraction of commonly specified information from business correspondence in U.S. Pat. No. 4,965,763, incorporated herein by reference.

The collected information, including, for example, the first and second types of patent information discussed above, are then transmitted to data processor 6 to process the collected data. The data which does not require processing in data processor 6 may be simply passed to indicator weighing device 8. Data processor 6 would then process the collected data as follows: For each of the above indicators, data processor 6 would assign an importance factor, based upon predetermined data stored in empirical database 12, for each of the indicators indicating the importance of the collected data with respect to each indicator. Data processor 6 may include any standard data processor such as the 386 data processor manufactured by various companies including Intel and may include the various functions of the artificial intelligence system in 4,670,848, incorporated herein by reference.

Empirical database 12 may be a single database storing all the required empirical data, or empirical database 12 may be comprised of several smaller databases each storing different required data used by the intellectual property audit system of the present invention. Empirical database may be any standard database and may include, for example, the data storage and processing apparatus in U.S. Pat. No. 3,911,403, incorporated herein by reference.

For example, if data access and collection device 4 searched the DIALOG database and collects information that a specific patent has been cited over 100 times, i.e., a citation indicator, data processor 6 might assign an importance factor of 10 on a scale of 1 to 10 to the citation indicator. Similarly, if database access and collection device 4 determines that the patent was searched in only one class for the class indicator, data processor 6 might assign a 1 on a scale of 1 to 10 to the class indicator. Note that currently, both the class and citation indicators have the same relative importance. As discussed above, data processor 6 determines the 10 value for the citation indicator and the 1 value for the class factor by comparing the indicators to predetermined indicators having predetermined values. These predetermined indicators are based upon collected known indicators from known intellectual property portfolios.

The determined worth indicators are then transmitted to an indicator weighing device 8 which prioritizes each of the indicators against each other based upon predetermined weighing schemes which have been determined from known portfolios by also consulting empirical database 12. For example, the citation indicator may be more important, for example twice as important, than the class indicator based upon predetermined experience.

The weighted indicators are transmitted to indicator comparing device 10 which compares the collection of worth indicators to known collections of worth indicators from known intellectual property portfolios by consulting database 12 storing the empirical data. Known distribution or estimation techniques could be used to determine the closest matching known intellectual property portfolio to the intellectual property portfolio which is to be acquired. Finally, the system would output the known value for which the portfolio to be acquired matches the most signifying a rough approximation of the worth of the portfolio to be acquired. The output may be displayed on any display, such as the display systems for electronic data processing equipment in U.S. Pat. No. 3,820,080, incorporated herein by reference.

In addition to the above features, the present invention also includes the feature of manual assistance processing in the event the process of the present invention fails for known or unknown reasons. Accordingly, when a failure occurs, a notice is generated to a predetermined location where manual assistance may be performed. Each of data input device 2, database access and collection device 4, data processor 6, indicator weighing device 8, indicator comparing device 10 are programmed to output manual assistance requests to different locations or the same location depending on whether the manual work force must be spread over more than one location. Thus, the present invention is also able to effectively correct failures in the processing of the intellectual property portfolio in order that the process continue to determine an intellectual property portfolio worth indicator. Thus, manual assistance may be performed for different aspects of the processing, and the processing may be restarted in a standard manner for the determination of the intellectual property worth indicator.

Finally, it should be noted that the various steps of the present invention are performed in hardware. Accordingly, each step of the present invention typically generates an electrical signal which represents a result of a specific step performed by each of the above elements in FIGS. 1 and 2. Accordingly, the above discussion represents the electrical signals which are generated and used in the various procedures of the present invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An intellectual property computer-implemented system for automatically determining a machine implemented estimated value of an intellectual property portfolio, comprising:

a first database storing first objectively determinable characteristics of the intellectual property portfolio to be estimated;

a database access and collection device connected to be responsive to said first database and accessing said first database and retrieving first objectively determinable characteristics;

a second database storing second objectively determinable characteristics of representative intellectual property portfolios and objectively determinable values corresponding to each of the representative intellectual property portfolios, the second objectively determinable characteristics and the objectively determinable values forming a baseline against which to assess the estimated value of the intellectual property portfolio; and a comparison device connected to be responsive to said database access and collection device and to said second database, said comparison device receiving the first objectively determinable characteristics from said database access and collection device and receiving the second objectively determinable characteristics and the objectively determinable values from the second database, and said comparison device comparing the first objectively determinable characteristics to the second objectively determinable characteristics and determining the estimated value of the intellectual property portfolio responsive to one of the objectively determinable values of one of the representative intellectual property portfolios having the second objectively determinable characteristics which are statistically similar to the first objectively determinable characteristics of the intellectual property portfolio.

2. An intellectual property computer-implemented system according to claim 1, wherein said first database comprises at least one of a patent database, a trademark database, a copyright database, and said first database further comprises a legal reporter database, a current events database and an intellectual property status database.

3. An intellectual property computer-implemented system according to claim 1, wherein said comparing device compares the first objectively determinable characteristics to the second objectively determinable characteristics using a statistical approximation technique.

4. An intellectual property computer-implemented system according to claim 1, wherein the intellectual property portfolio comprises a patent portfolio including patents, and wherein the first objectively determinable characteristics includes patent information derived from the patents in the patent portfolio comprising at least one of the following: number of claims, length of independent claims, number and dates of references cited, number of classes searched, legal status of the patents, number of years until each of the patents expire, group which examined each of the patents, domestic priority, and foreign priority.

5. An intellectual property computer-implemented system according to claim 4, wherein the first information further includes frequency with which the patents have been cited as references for other patents.

6. An intellectual property computer-implemented system according to claim 1, further comprising an indicator weighing device connected to said comparing device and weighing each of the first and second objectively determinable characteristics according to predetermined weighing factors producing weighed first and second objectively determinable characteristics, and wherein said comparing device compares the weighed first and second objectively determinable characteristics to determine the statistical similarity between the weighed first and second objectively determinable characteristics.

7. An intellectual property computer-implemented system according to claim 1, wherein the intellectual property portfolio includes issued patents, and at least one of trademarks and copyrights, and wherein the first objectively determinable characteristics are derived by analyzing the issued patents, and the at least one of trademarks and copyrights.

8. An intellectual property computer-implemented system according to claim 1, wherein the estimated value of the intellectual property portfolio is derived independently of accounting valuation techniques including cost, market and income approaches.

9. An intellectual property computer-implemented system according to claim 1, wherein the first objectively determinable characteristics include first valuation indicators, wherein said database access and collection device retrieves the first valuation indicators from said first database and assigns an importance factor to each of the first valuation indicators based upon predetermined criteria, and wherein said comparison device compares the first valuation indicators to the second objectively determinable characteristics and determines the estimated value of the intellectual property portfolio responsive to the importance factor of each of the valuation indicators.

10. An intellectual property computer-implemented system according to claim 1, wherein the objectively determinable values of the representative intellectual property portfolios include objectively determinable monetary values which are not determined by said intellectual property computer-implemented system.

11. An intellectual property computer-implemented system according to claim 10, wherein the objectively determinable monetary values of the representative intellectual property portfolios are determined by at least one of prior adjudication, prior license values, prior purchase values and an accountant evaluation based upon generally acceptable accounting procedures (GAAP) of the representative intellectual property portfolios.

12. A computer architecture for automatically determining a machine implemented estimated value of an intellectual property portfolio, comprising:

a first database storing first information representing first objectively determinable characteristics of the intellectual property portfolio to be estimated;

a database access and collection device connected to be responsive to said first database and accessing said first database and retrieving the first information;

a second database storing second information representing second objectively determinable characteristics of representative intellectual property portfolios and objectively determinable values corresponding to each of the representative intellectual property portfolios, the second information providing a baseline against which to assess the estimated value of the intellectual property portfolio;

a data processor connected to be responsive to said database access and collection device, receiving the first information from said database access and collection device, and assigning importance factors for each of the first objectively determinable characteristics based upon predetermined importance factor criteria producing ranked first characteristics;

an indicator weighing device connected to be responsive to said data processor, receiving the ranked first characteristics from said data processor, and prioritizing the ranked first characteristics based upon predetermined priority information producing prioritized first characteristics; and an indicator collection and comparison device connected to be responsive to said indicator weighing device and to said second database, said indicator collection and comparison device receiving the prioritized first characteristics from said indicator weighing device and receiving the second information from said second database, and said indicator collection and comparison device comparing the prioritized first characteristics to the second objectively determinable characteristics and determining the estimated value of the intellectual property portfolio responsive to one of the objectively determinable values of one of the representative intellectual property portfolios having the second objectively determinable characteristics which are statistically similar to the prioritized first characteristics of the intellectual property portfolio.

13. An intellectual property computer-implemented system for automatically determining a machine implemented estimated value of an intellectual property portfolio, comprising:

first means for storing first objectively determinable characteristics of the intellectual property portfolio to be estimated;

means for accessing said first means for storing and retrieving first objectively determinable characteristics;

second means for storing second objectively determinable characteristics of representative intellectual property portfolios and objectively determinable values corresponding to each of the representative intellectual property portfolios, the second objectively determinable characteristics and the objectively determinable values forming a baseline against which to assess the estimated value of the intellectual property portfolio; and comparing means for receiving the first objectively determinable characteristics from said means for accessing and for receiving the second objectively determinable characteristics and the objectively determinable values from the second means for storing, and said comparing means for comparing the first objectively determinable characteristics to the second objectively determinable characteristics and determining the estimated value of the intellectual property portfolio responsive to one of the objectively determinable values of one of the representative intellectual property portfolios having the second objectively determinable characteristics which are statistically similar to the first objectively determinable characteristics of the intellectual property portfolio.

14. A computer-implemented intellectual property method for automatically determining a machine implemented estimated value of an intellectual property portfolio, comprising the steps of:

(a) storing first objectively determinable characteristics of representative intellectual property portfolios and objectively determinable values corresponding to each of the representative intellectual property portfolios, the first objectively determinable characteristics and the objectively determinable values forming a baseline against which to assess the estimated value of the intellectual property portfolio;

(b) analyzing the intellectual property portfolio stored in an intellectual property database to determine second objectively determinable characteristics of the intellectual property portfolio to be estimated;

(c) deriving first information representing the second objectively determinable characteristics of the intellectual property portfolio to be estimated responsive to said analyzing step (b) and generating a first electrical signal indicative of the first information;

(d) retrieving second information representing the first objectively determinable characteristics and the objectively determinable values of the representative intellectual property portfolios and generating a second electrical signal indicative of the second information; and (e) comparing the first signal indicative of the first information received from said deriving step (c) to the second signal indicative of the second information received from said retrieving step (d) producing an estimated value electrical signal indicating the estimated value of the intellectual property portfolio when the first information of the intellectual property portfolio is statistically similar to the second information of one of the representative intellectual property portfolios.

wherein the intellectual property database includes one of a patent database, a trademark database, and a copyright database, and the intellectual property database further includes one of a legal reporter database, a current events database and an intellectual property status database.

15. A computer-implemented intellectual property method according to claim 14, wherein the intellectual property portfolio to be estimated comprises patents, and at least one of trademarked and copyrighted intellectual property.

16. A computer-implemented intellectual property method according to claim 14, wherein said comparing step (e) further comprises the step of comparing the first signal to the second signal and determining the estimated value signal using a statistical approximation technique including one of a curve fitting technique and a standard deviation technique.

17. A computer-implemented intellectual property method according to claim 14, wherein the intellectual property portfolio comprises a patent portfolio including patents, and wherein the first information includes patent information derived from the patents in the patent portfolio comprising at least one of the following: number of claims, length of independent claims, number and dates of references cited, number of classes searched, legal status of the patents, number of years until each of the patents expire, group which examined each of the patents, domestic priority, foreign priority, inventor nationality, and current owner headquarters location.

18. A computer-implemented intellectual property method according to claim 14, further comprising the step of weighing the estimated value signal according to a predetermined weighing factor producing a weighed estimated value signal.

19. A computer-implemented intellectual property method according to claim 14, wherein the estimated value signal is derived independently of accounting valuation techniques including cost, market and income approaches.

20. A computer-implemented intellectual property method according to claim 14, wherein the first information includes valuation indicators, wherein said analyzing step (b) further comprises the step of analyzing the valuation indicators, wherein said deriving step (c) further comprises the step of deriving the first information and assigning an importance factor to each of the valuation indicators based upon predetermined criteria, and wherein said comparing step (e) further comprises the step of comparing the valuation indicators to the second information and determining the estimated value signal responsive to the importance factor of each of the valuation indicators.

21. An intellectual property computer-implemented method according to claim 14, wherein the objectively determinable values of the representative intellectual property portfolios include objectively determinable monetary values which are not determined by said intellectual property computer-implemented system.

22. An intellectual property computer-implemented method according to claim 21, wherein the objectively determinable monetary values of the representative intellectual property portfolios are determined by at least one of the following: prior adjudication, prior license values, prior purchase values and an accountant evaluation based upon generally acceptable accounting procedures (GAAP) of the representative intellectual property portfolios.

* * * * *